US010735765B2

(12) United States Patent
Shen

(10) Patent No.: US 10,735,765 B2
(45) Date of Patent: Aug. 4, 2020

(54) MODIFIED PSEUDO-CYLINDRICAL MAPPING OF SPHERICAL VIDEO USING LINEAR INTERPOLATION OF EMPTY AREAS FOR COMPRESSION OF STREAMED IMAGES

(71) Applicant: Hong Kong Applied Science and Technology Research Institute Company, Limited, Hong Kong (HK)

(72) Inventor: Tak Wai Shen, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 201 days.

(21) Appl. No.: 16/002,165

(22) Filed: Jun. 7, 2018

(65) Prior Publication Data
US 2019/0379910 A1    Dec. 12, 2019

(51) Int. Cl.
*H04N 19/597* (2014.01)
*H04N 13/161* (2018.01)
(Continued)

(52) U.S. Cl.
CPC .......... *H04N 19/597* (2014.11); *G06F 3/012* (2013.01); *G06T 3/0062* (2013.01); *H04N 13/161* (2018.05); *H04N 19/423* (2014.11)

(58) Field of Classification Search
CPC .. H04N 19/597; H04N 19/423; H04N 13/161; G06F 3/012; G06T 3/0062
See application file for complete search history.

(56) References Cited

U.S. PATENT DOCUMENTS 9,258,566 B1    2/2016 Queru
9,721,393 B1    8/2017 Dunn et al.
(Continued)

FOREIGN PATENT DOCUMENTS

CN    105812759 A    7/2016
CN    106162140 A    11/2016
(Continued)

OTHER PUBLICATIONS

ISR and Written Opinion, PCT/CN2018/090708, dated Feb. 27, 2019.
Office Action, SIPO, Chinese Patent APN 201880000751.X, dated May 11, 2020.

*Primary Examiner* — Joseph Suh
(74) *Attorney, Agent, or Firm* — Stuart T. Auvinen; gPatent LLC

(57) ABSTRACT

A panoramic video stream is compressed. Sinusoidal projection is performed on spherical input images to generate pseudo-cylindrical projection images. A lower-left region and a lower-right region of the image are cut and moved to upper corners of the rectangular bounding box around the pseudo-cylindrical projection image. These upper corners are non-effective areas of default dark pixels with no image pixels. A bottom one-third of the rows of pixels from the image that contained the moved regions are deleted, compressing the image by 33%. Default dark pixels in interface regions between the moved regions and the pseudo-cylindrical projection image are linear interpolated to provide gradual changes in pixel values across the remaining formerly non-effective regions, preventing encoding artifacts caused by abrupt changes in pixel values. Functions may be implemented using lookup tables. Non-focus image areas may be downsampled for additional compression using multi-resolution mapping and adaptive view streaming.

20 Claims, 17 Drawing Sheets

(51) Int. Cl.
*G06T 3/00* (2006.01)
*G06F 3/01* (2006.01)
*H04N 19/423* (2014.01)

(56) References Cited

U.S. PATENT DOCUMENTS

| | | |
|---|---|---|
| 9,781,356 B1 | 10/2017 | Banta et al. |
| 9,811,946 B1 | 11/2017 | Hung et al. |
| 2014/0146044 A1* | 5/2014 | Cvetko .................. G06F 19/321 |
| | | 345/420 |
| 2014/0267856 A1* | 9/2014 | McMillan .......... H04N 5/37452 |
| | | 348/302 |
| 2016/0112713 A1 | 4/2016 | Russell |
| 2016/0353146 A1 | 12/2016 | Weaver et al. |
| 2017/0084073 A1 | 3/2017 | Pio et al. |
| 2017/0294049 A1* | 10/2017 | Zhou ....................... G06F 3/012 |
| 2018/0063512 A1* | 3/2018 | Hong .................. H04N 13/363 |

FOREIGN PATENT DOCUMENTS

| | | |
|---|---|---|
| CN | 106210716 A | 12/2016 |
| CN | 106341673 A | 1/2017 |
| CN | 106375760 A | 2/2017 |
| CN | 107622474 A | 1/2018 |
| WO | WO2017158236 | 9/2017 |
| WO | WO2017158236 A2 | 9/2017 |
| WO | WO2018087425 A1 | 5/2018 |

* cited by examiner

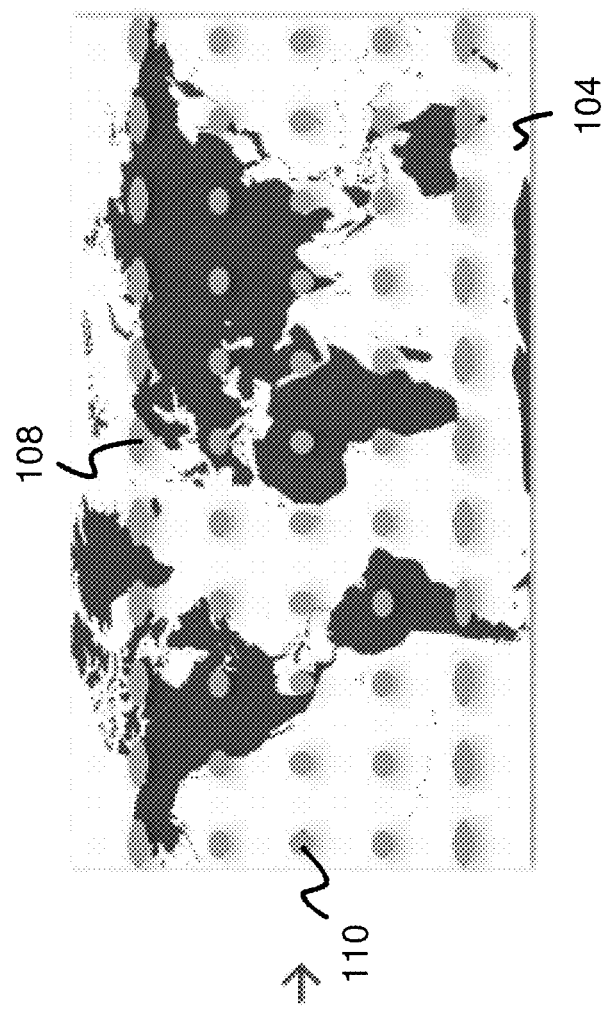
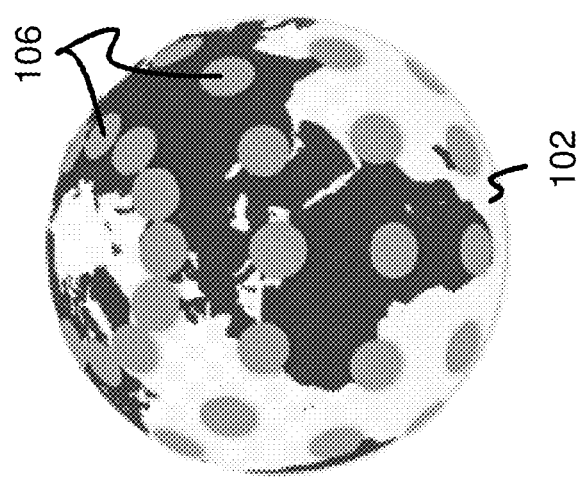
FIG. 2
PRIOR ART

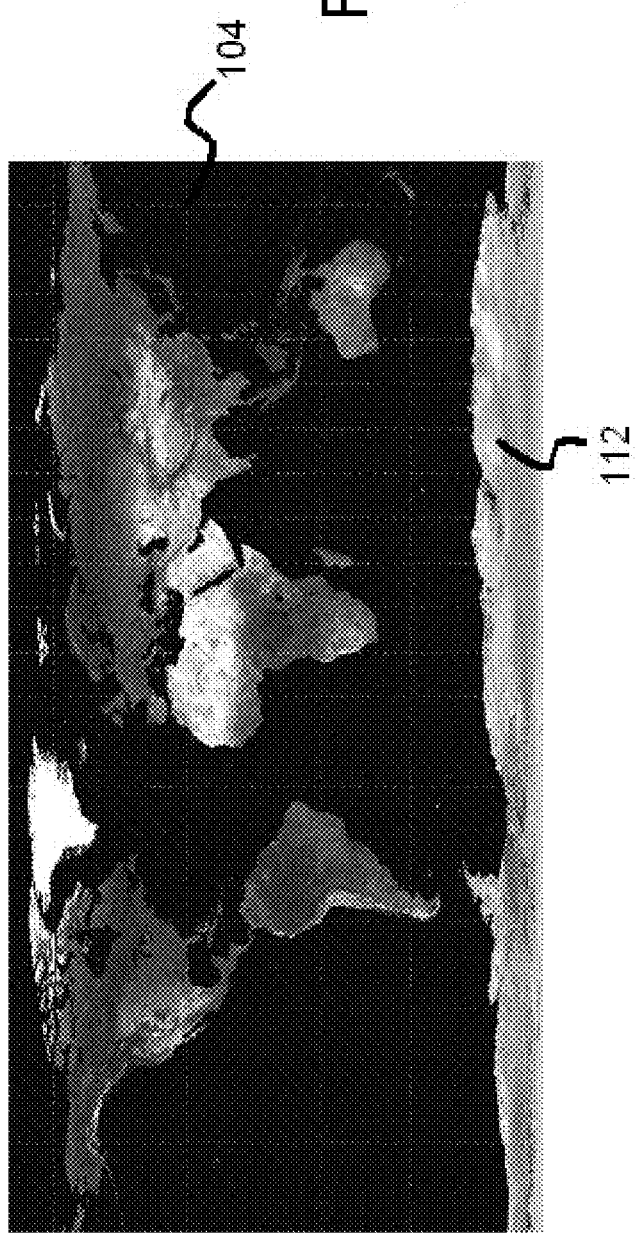
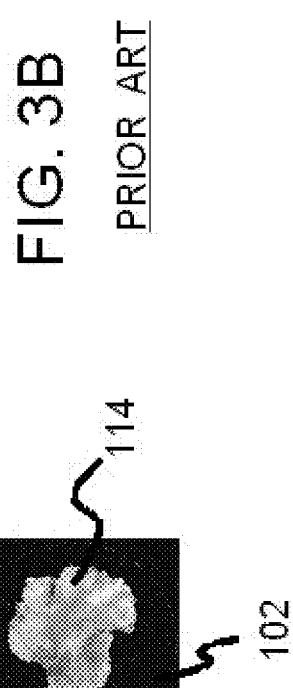
FIG. 3A PRIOR ART
FIG. 3B PRIOR ART

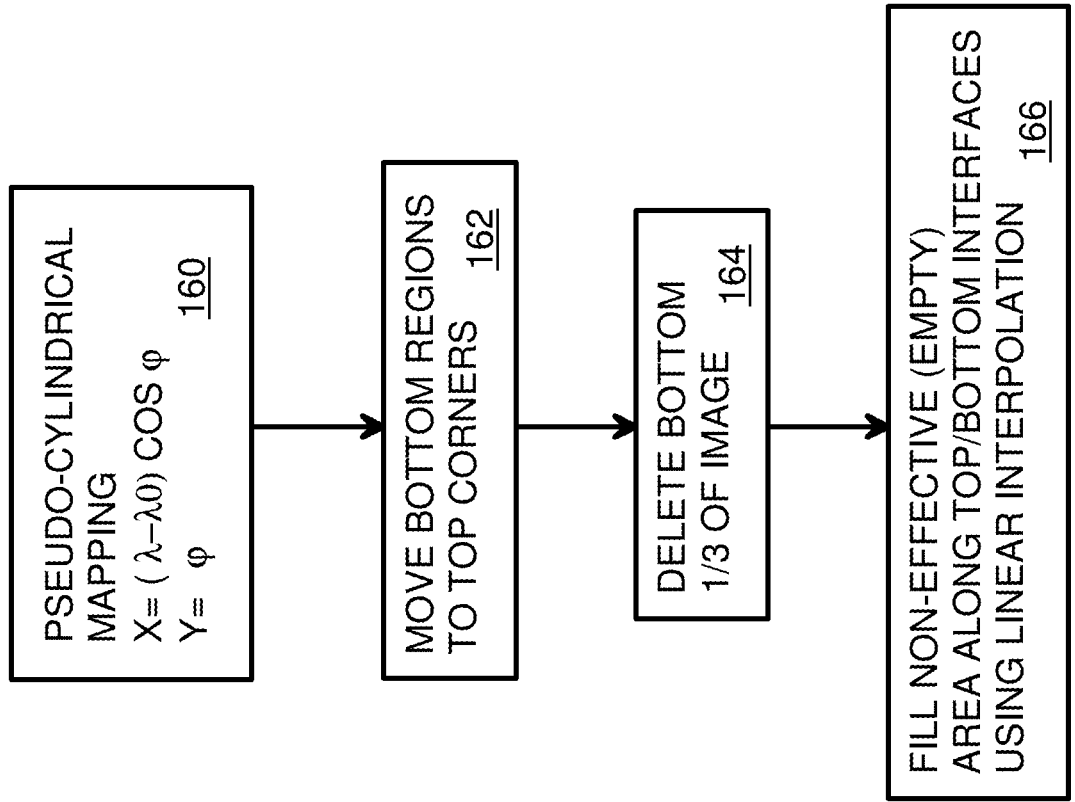

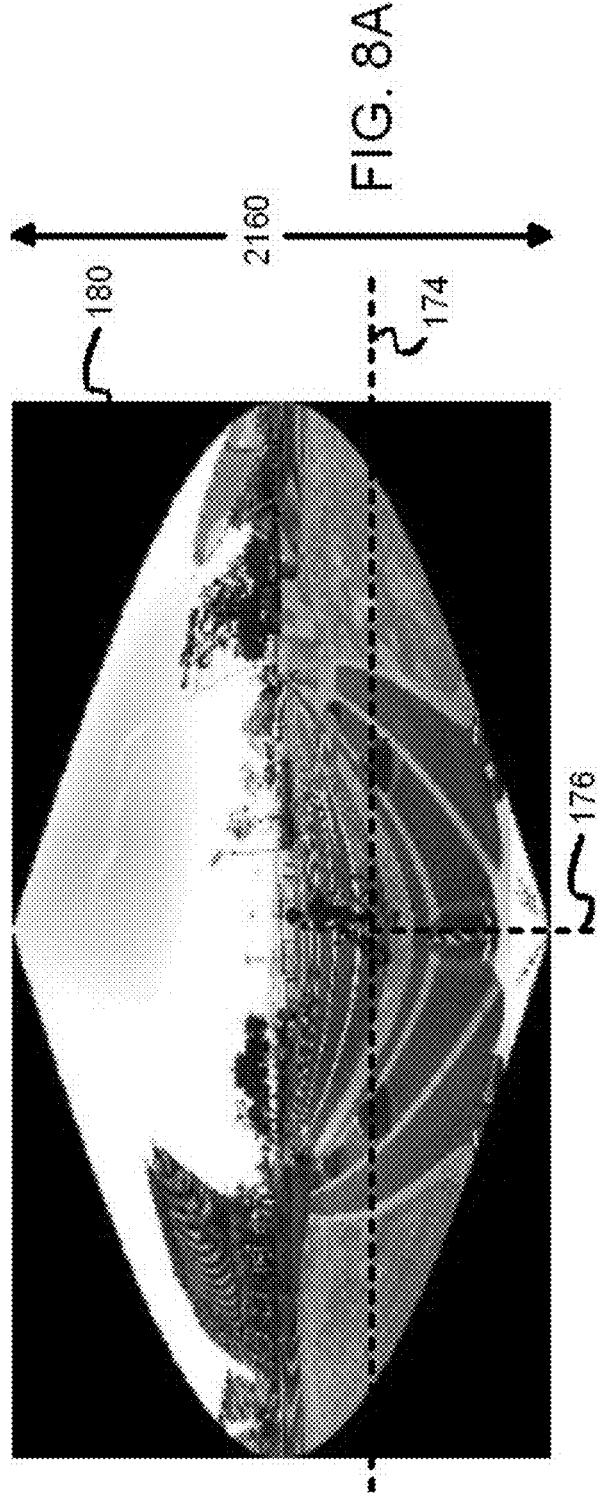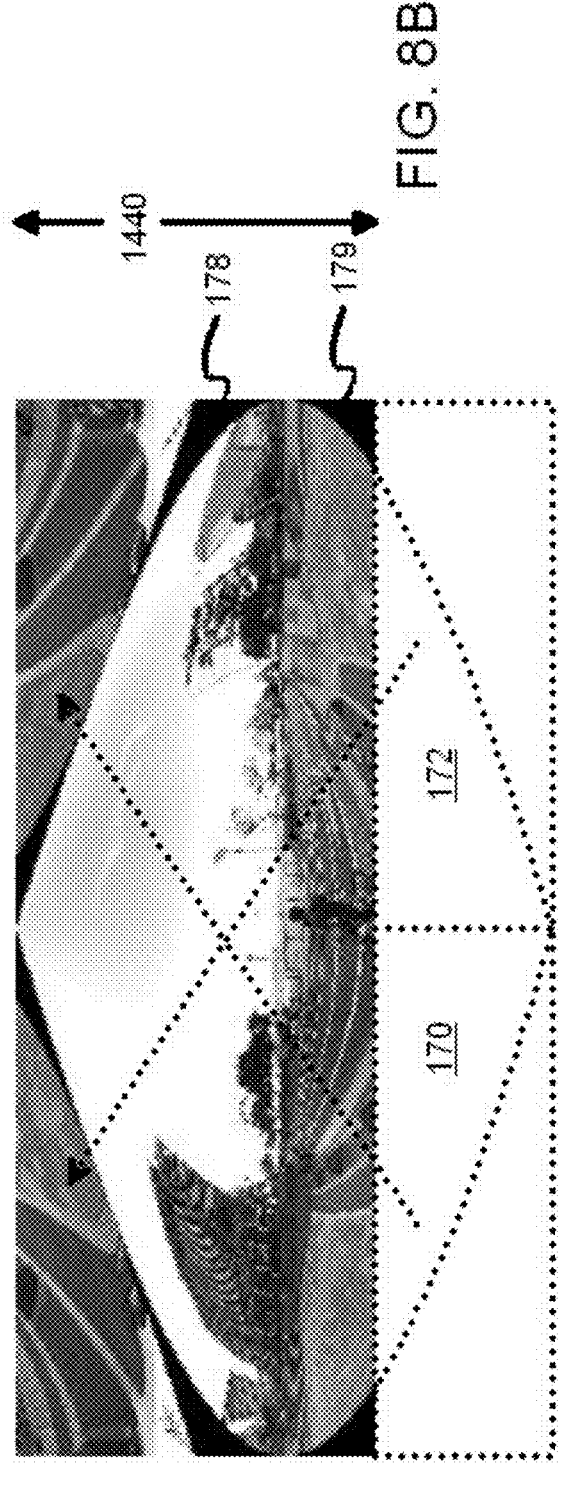
FIG. 8A
FIG. 8B

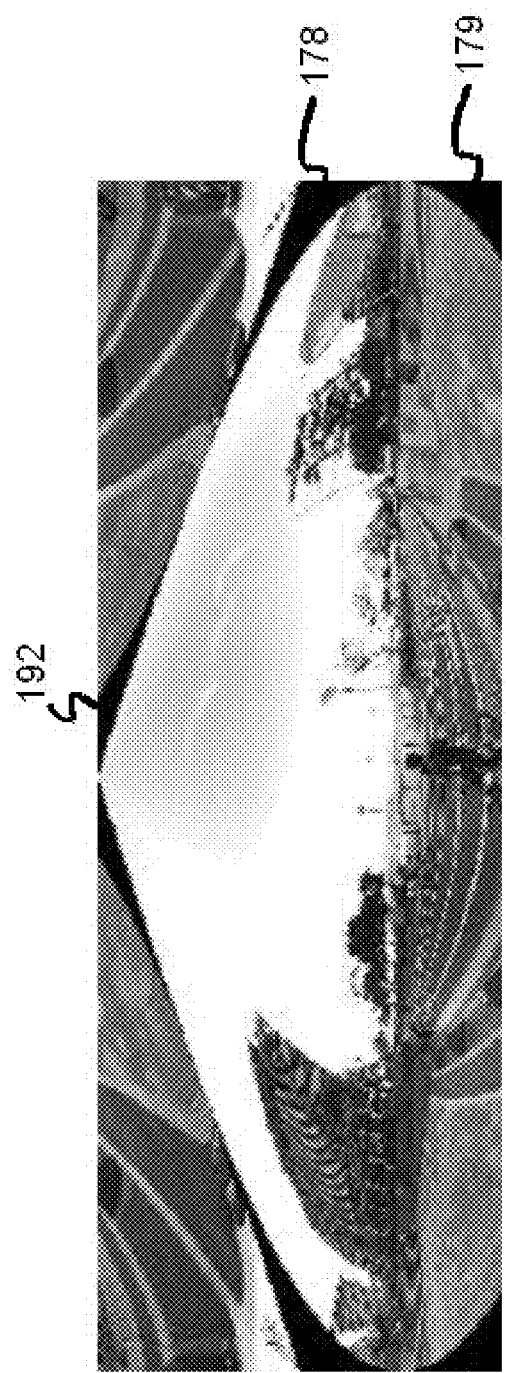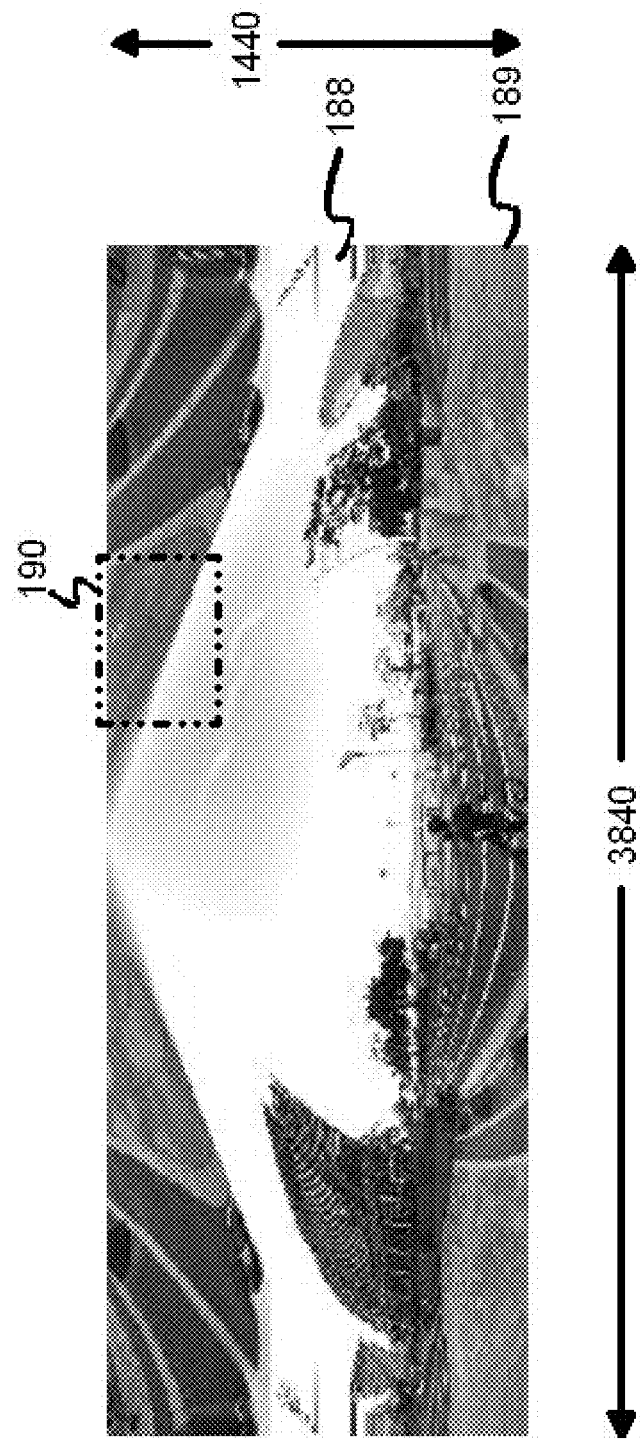

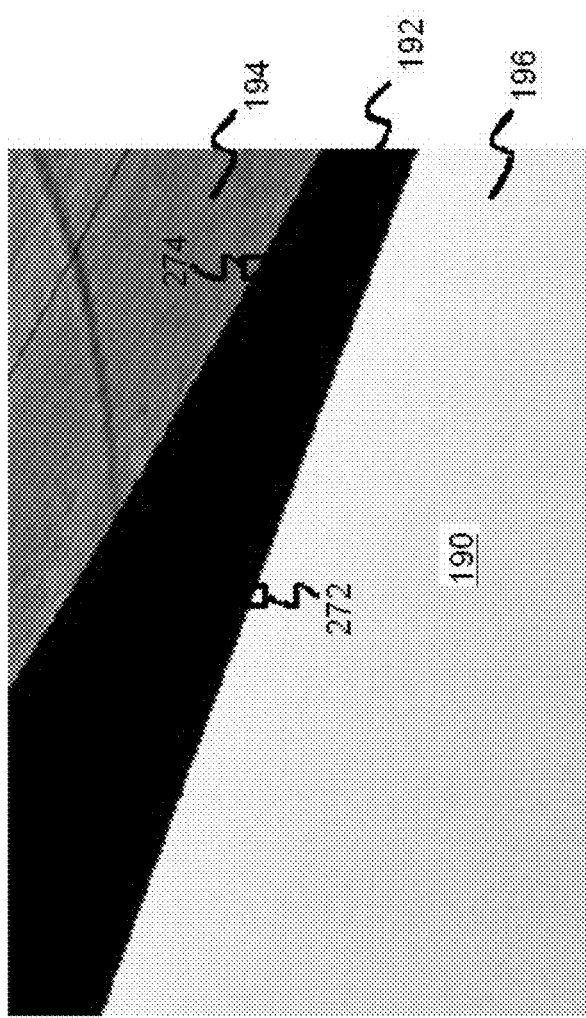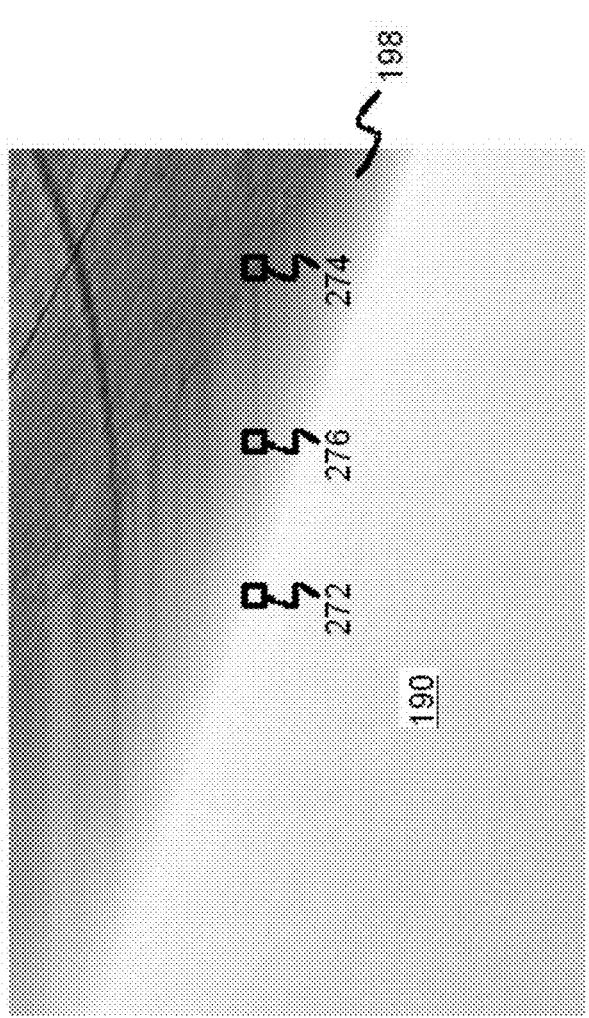

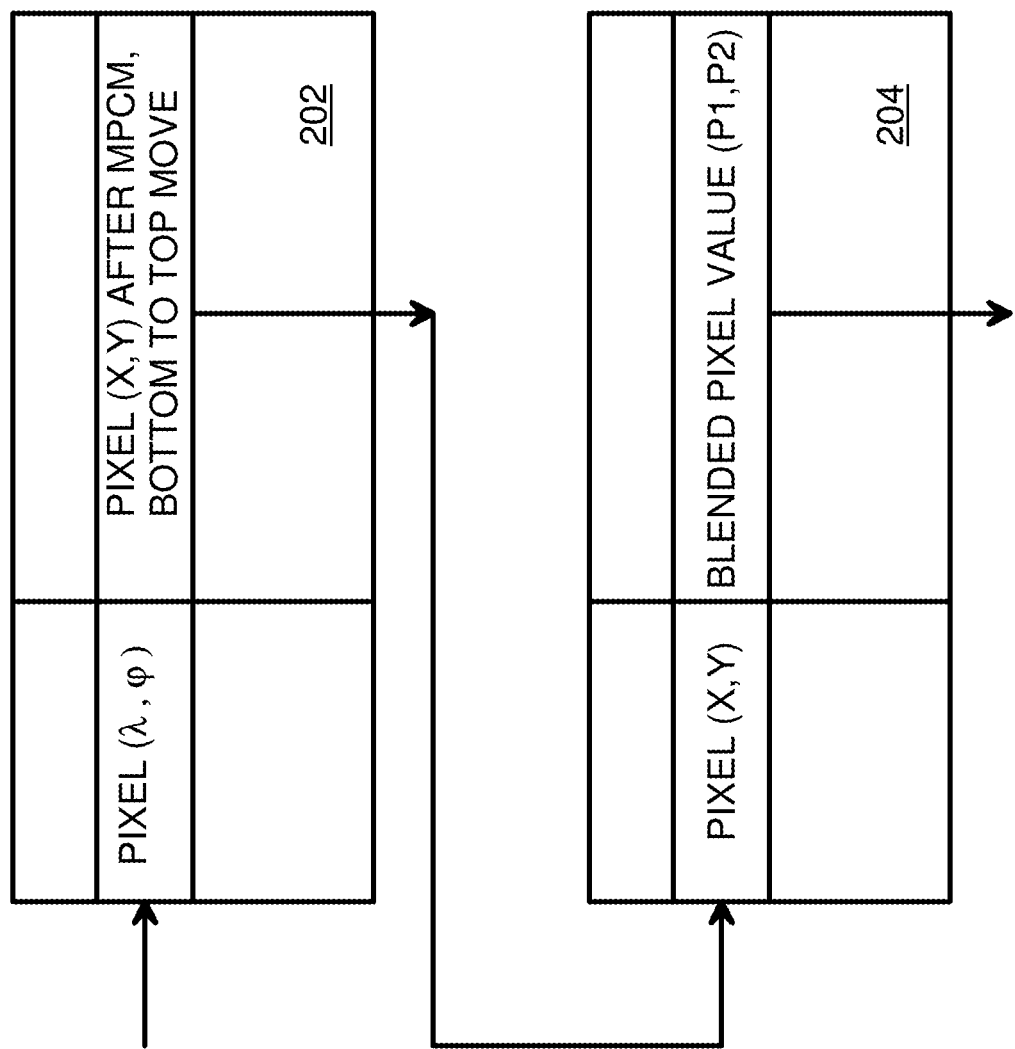

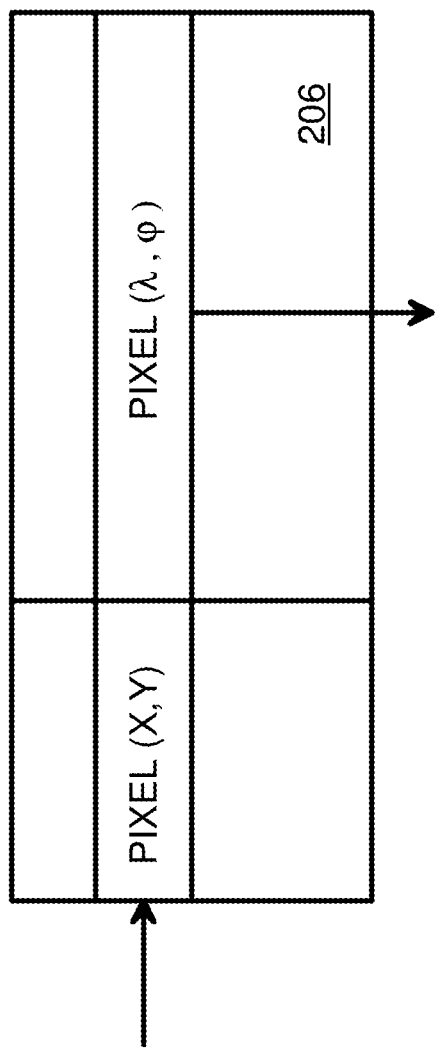

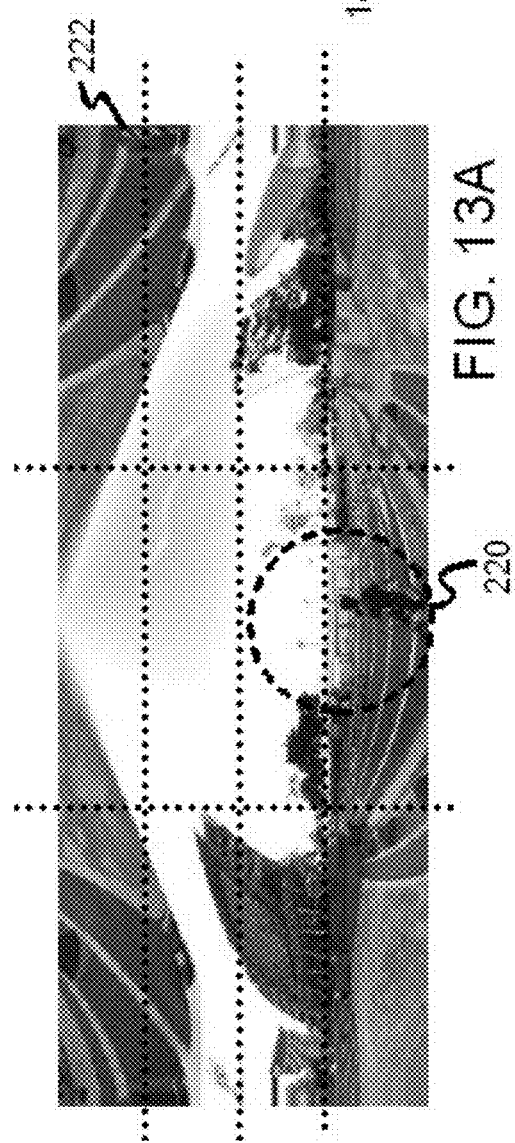
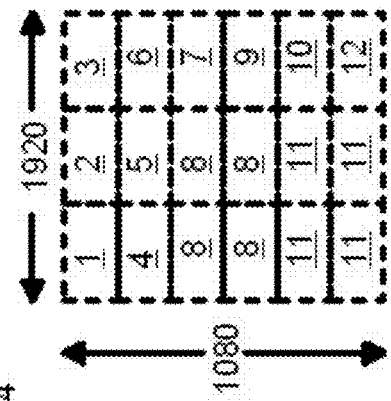
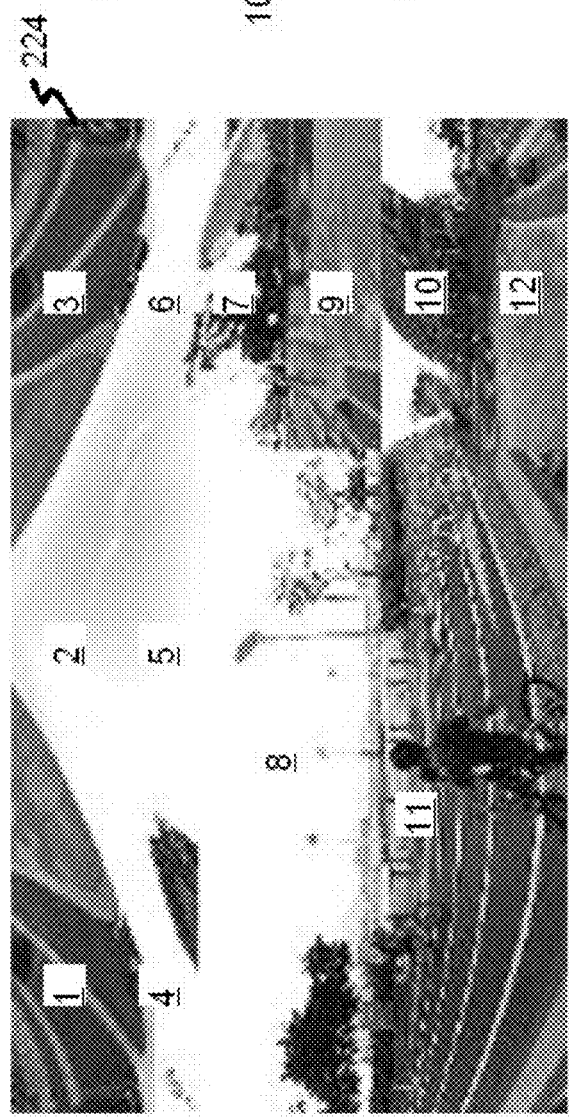
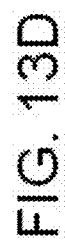
FIG. 13A
FIG. 13B
FIG. 13C
FIG. 13D

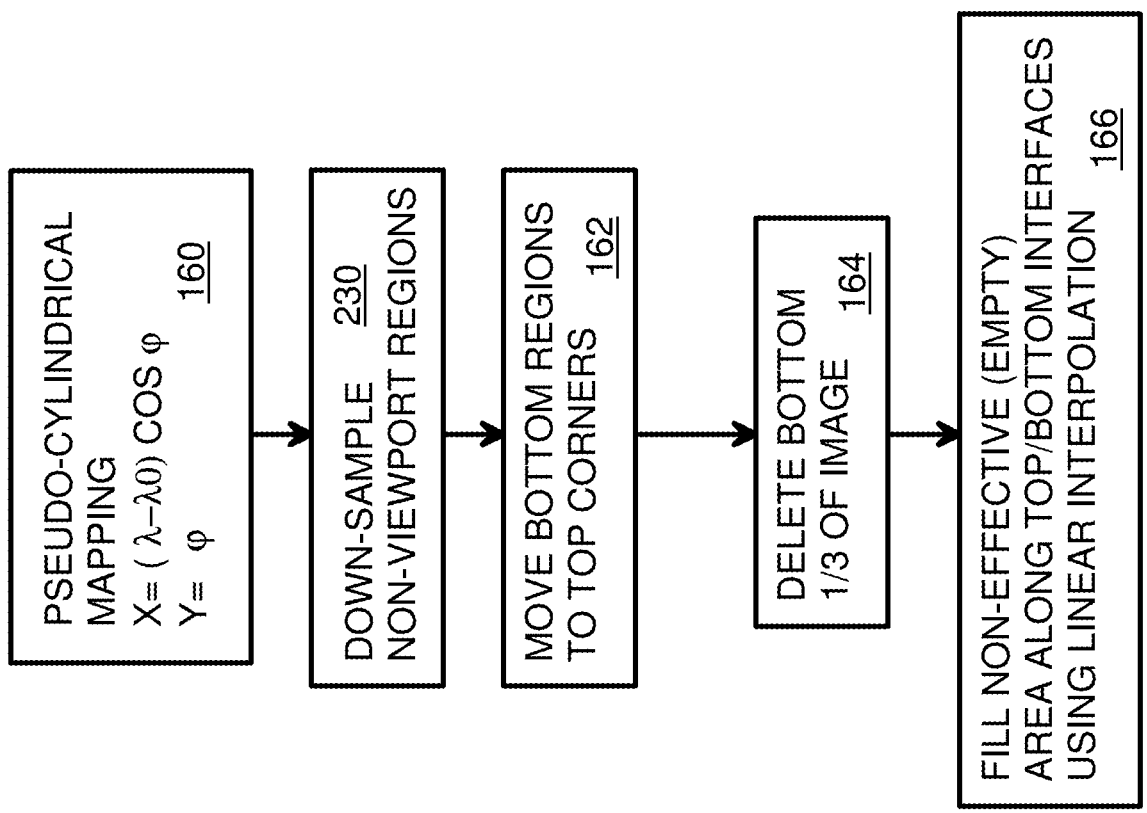

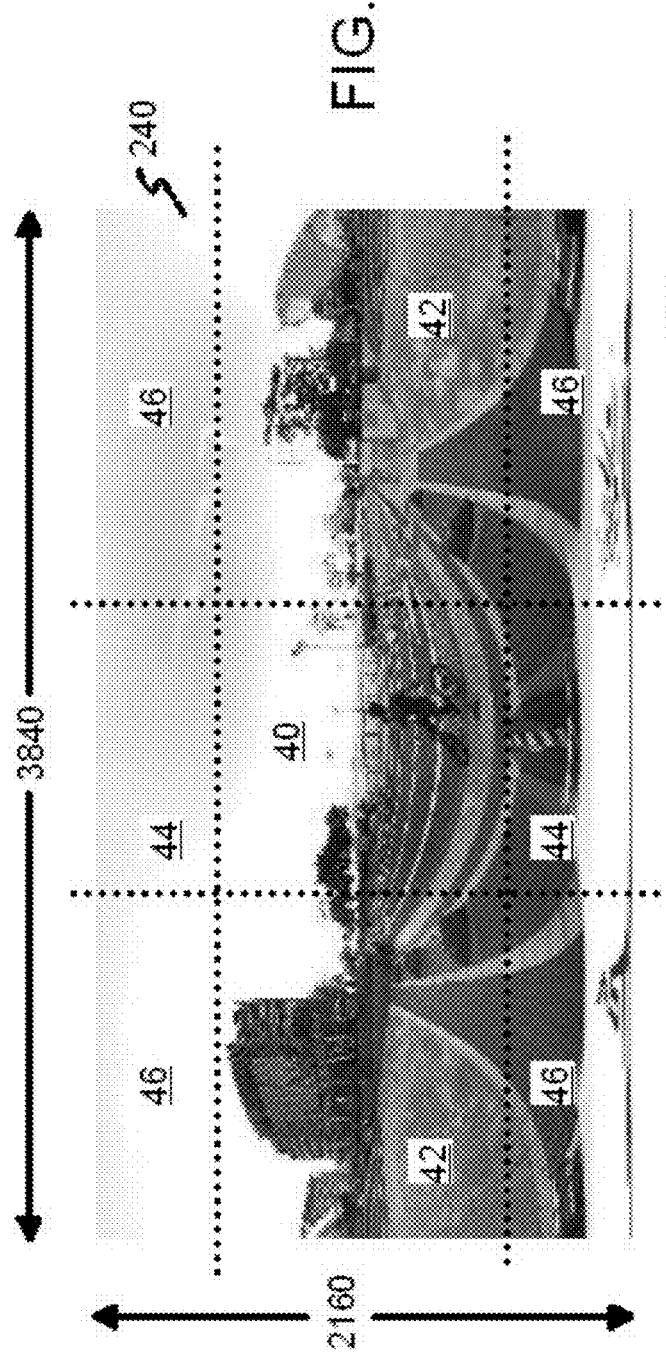
FIG. 15A
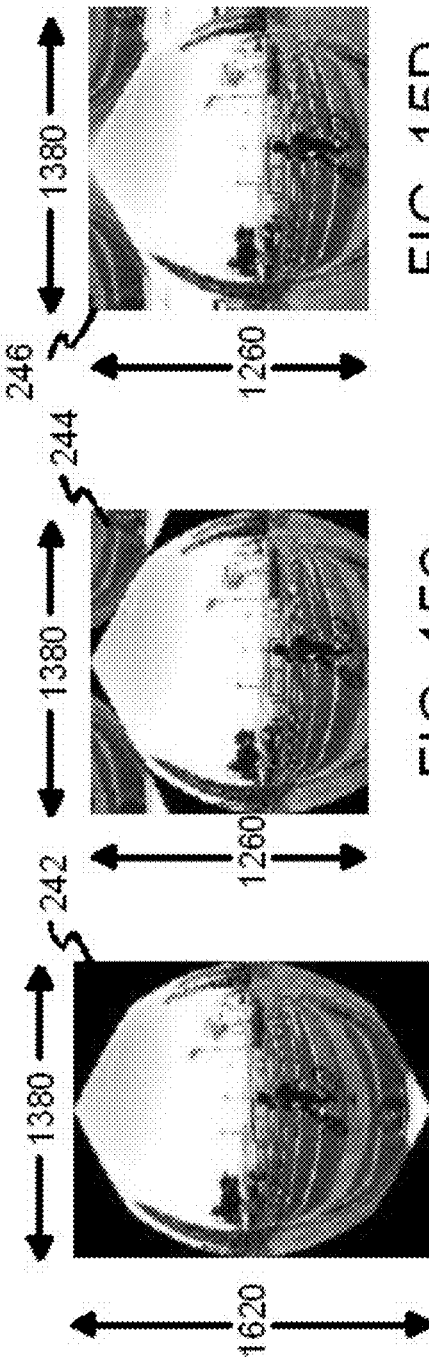
FIG. 15D
FIG. 15C
FIG. 15B

MODIFIED PSEUDO-CYLINDRICAL MAPPING OF SPHERICAL VIDEO USING LINEAR INTERPOLATION OF EMPTY AREAS FOR COMPRESSION OF STREAMED IMAGES

FIELD OF THE INVENTION

This invention relates to panoramic imaging, and more particularly to compression of panoramic images.

BACKGROUND OF THE INVENTION

In a typical Virtual Reality (VR) application, a 360-degree panoramic image or video is captured. A user wearing special goggles such as a Head-Mounted-Display (HMD) can actively select and vary his viewpoint to get an immersive experience in a 360-degree panoramic space. A wide variety of interesting and useful applications are possible as VR camera technology improves and shrinks.

Higher resolution cameras are being used to capture panoramic images. More pixels need to be stored and transmitted for these higher-resolution panoramic images. Various coding methods are known to compress these panoramic images. Coding methods such as cubemap, adjusting tile projection, and pseudo-cylindrical projection are known.

FIGS. 1A-1C show panoramic cameras. FIG. 1A shows a prior-art VR ring camera. Ring camera 14 has multiple cameras 17 arranged in a ring. This arrangement of cameras 17 allows for a 360-degree panorama to be captured. When cameras 17 are video cameras, a panoramic video is captured. The Google Jump is an example of a VR ring camera.

In FIG. 1B, the ring camera of FIG. 1A has a ring of High-Resolution (HR) cameras 17 that generate HR images 18, each of a small arc of the full panoramic circle. HR images 18 overlap each other and details from two of HR images 18 are combined in some manner in stitch regions 19. However, since the ring camera has cameras 17 arranged in a two-dimensional ring, some image loss or distortion may occur at the tops and bottoms of HR images 18.

FIG. 1C shows a spherical camera. Spherical camera 16 has a ring of multiple cameras 17 along the equatorial ring, similar to that of FIG. 1A. Additional non-equatorial cameras 15 are placed above and below the equatorial ring of cameras 17. These additional non-equatorial cameras 15 can better capture images details near the polar regions.

FIG. 2 shows an equi-rectangular projection of a panoramic image. The true spherical image 102 has original features 106 that are shown as dots of equal size and shape. When true spherical image 102 is captured by a ring camera or a spherical camera and projected into a VR space, distortion can occur due to the projection. In equi-rectangular projection space 104, original features 106 that are near the equator are relatively undistorted, such as equatorial features 110. However, original features 106 that are farther from the equator are relatively distorted, such as polar features 108. The amount of distortion increases with the distance from the equator, so very noticeable distortion occurs near the poles. Original pixels from true spherical image 102 are stretched out or replicated to cover more area in equi-rectangular projection space 104, making polar objects appear larger than they really are in true spherical image 102. Redundant information exists in the polar regions in equi-rectangular projection space 104, and the poles have more pixels that the equator. This uneven distribution of pixels and distortion is undesirable.

FIGS. 3A-3B highlight distortion of polar objects in a equi-rectangular projection. In FIG. 3A, polar object 112 in equi-rectangular projection space 104 is stretched and appears much larger than the actual polar object 114 in true spherical image 102. Aside from the visual distortion, too many pixels are present in polar object 112 in equi-rectangular projection space 104, which is wasteful of storage and bandwidth. Thus equi-rectangular projection is undesirable.

FIG. 4 shows a pseudo-cylindrical projection. True spherical image 102 (FIG. 2) is mapped using a sinusoidal projection onto pseudo-cylindrical projection 130. Horizontal parallels 132 are straight and have the same lengths as in true spherical image 102. Central vertical meridian 134 is straight while other vertical lines are sinusoidal. The surface area of pseudo-cylindrical projection 130 is the same as the surface area of true spherical image 102. Polar objects 136 have the same area as actual polar object 114 in true spherical image 102.

While useful, pseudo-cylindrical projection 130 offers no reduction in the size of equi-rectangular projection space 104, since the areas are the same. The same pixel storage and bandwidth is required when using either equi-rectangular projection space 104 or pseudo-cylindrical projection 130 as the panoramic image.

What is desired is compression of a pseudo-cylindrical projection for use with Virtual Reality (VR) systems and other panoramic image systems. A compressed pseudo-cylindrical projection that can be used when storing and transmitting panoramic images is desired. Reduction in storage requirements of a panoramic image is desirable.

BRIEF DESCRIPTION OF THE DRAWINGS

FIG. 2 shows an equi-rectangular projection of a panoramic image.

FIGS. 3A-3B highlight distortion of polar objects in a equi-rectangular projection.

FIG. 6 is a flowchart of compression of a pseudo-cylindrical projection image.

FIGS. 8A-8B show moving the bottom one-third of the pseudo-cylindrical projection image to the top corners.

FIGS. 9A-9B show linear-interpolated pixels created to fill interface regions in the compressed panoramic image.

FIGS. 10A-10B show creating linear-interpolated pixels to populate interface regions.

FIG. 11 shows encoding lookup tables to move pixel locations and to linear interpolate pixels.

FIG. 12 is a one-step decoding table.

FIGS. 13A-13D shows pre-processing the spherical image using multi-resolution mapping.

FIG. 14 is a flowchart of an alternative multi-resolution mapping process that downsamples non-focus blocks after pseudo-cylindrical projection.

FIGS. 15A-15D shows processing the pseudo-cylindrical projection image using multi-resolution mapping.

DETAILED DESCRIPTION

The present invention relates to an improvement in image compression of panoramic images. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1C:
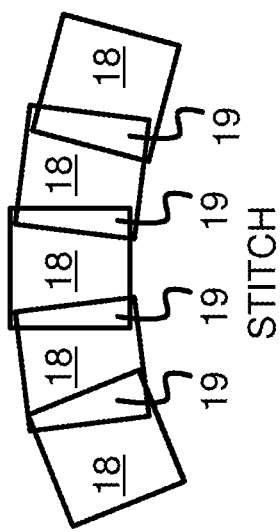
FIGS. 1A-1C show panoramic cameras.
Figure 1A:
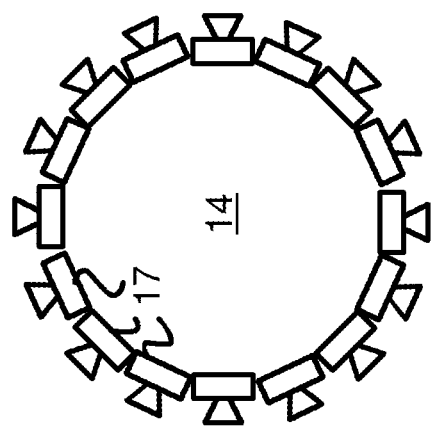
Figure 1B:
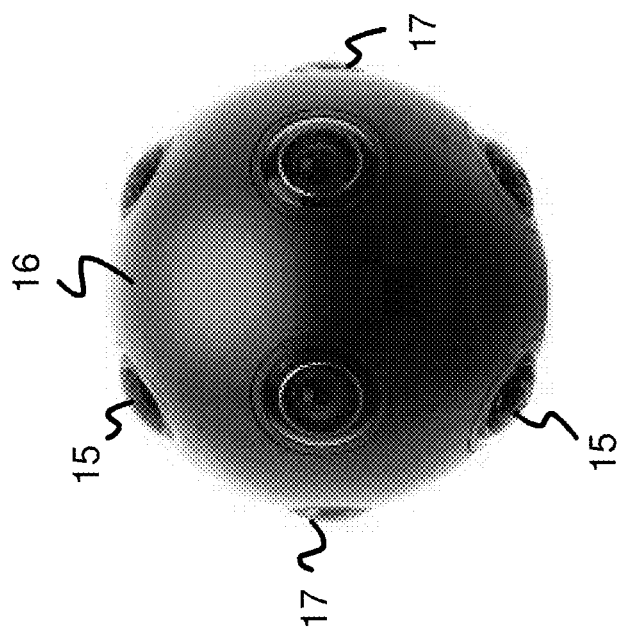
Figure 4:
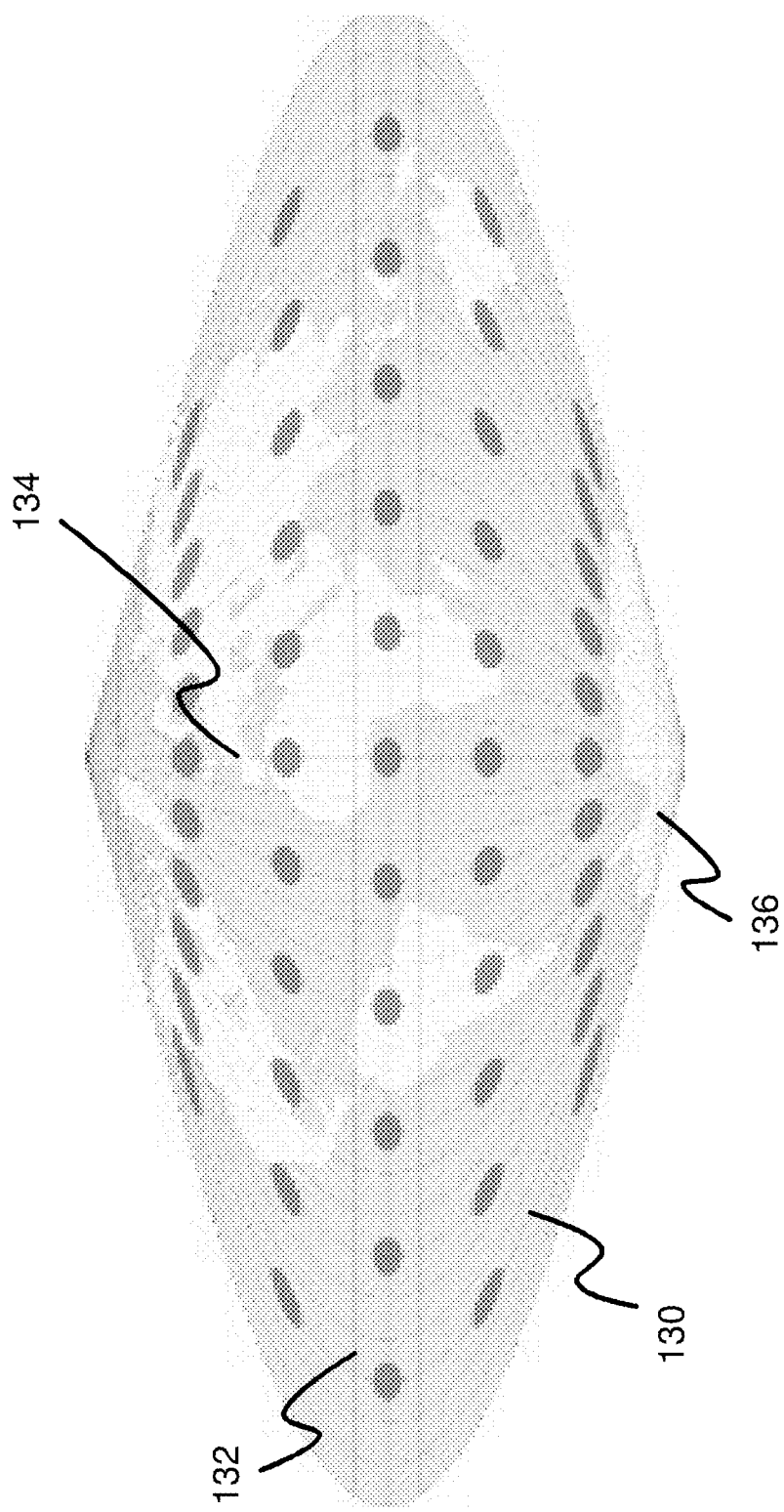
FIG. 4 shows a pseudo-cylindrical projection.
Figure 5:
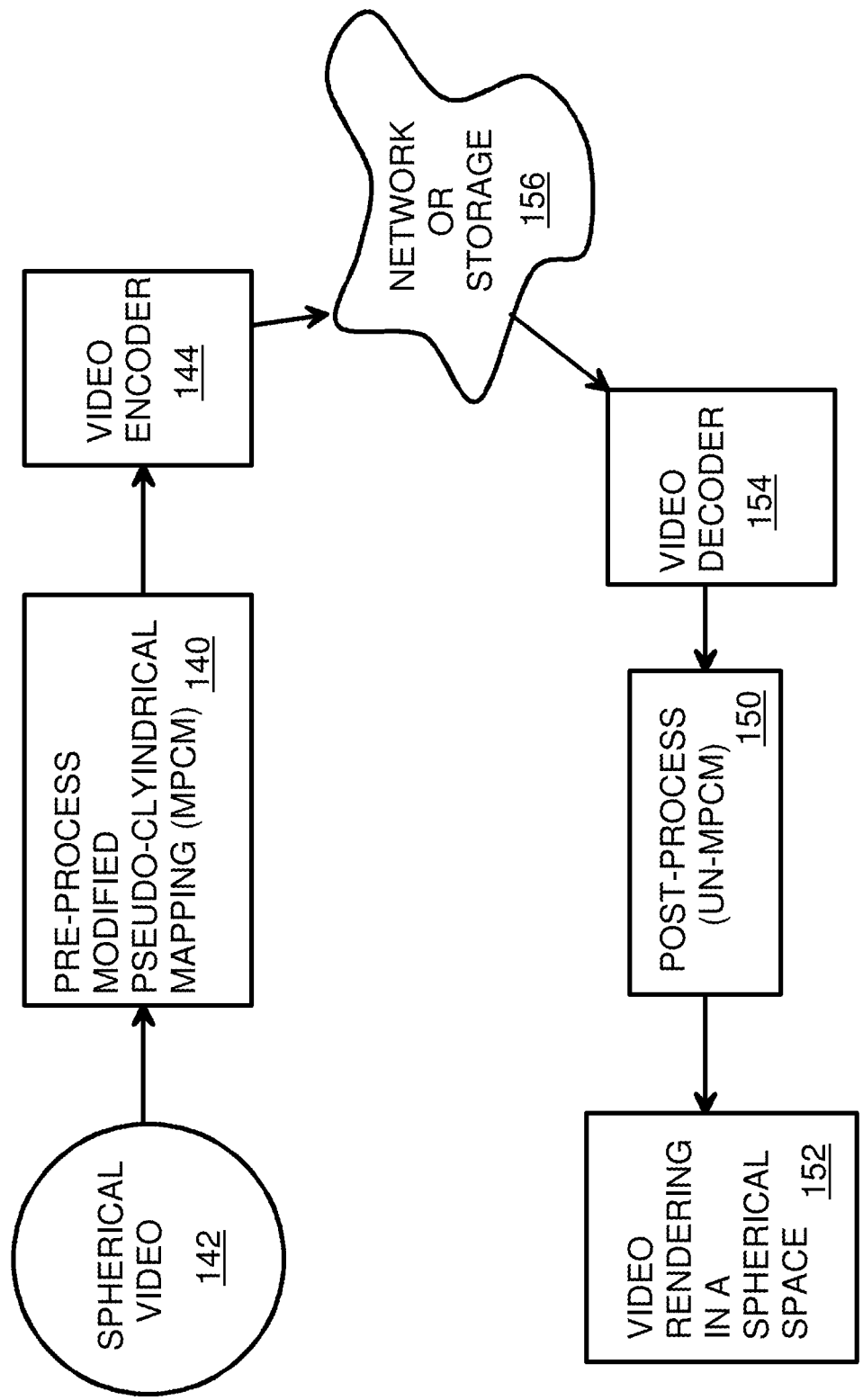
FIG. 5 is a flowchart of a modified pseudo-cylindrical mapping video system.

FIG. 5 is a flowchart of a modified pseudo-cylindrical mapping video system. A ring or spherical camera such as shown in FIG. 1 captures a series of panoramic images as spherical video 142. Spherical video 142 is pre-processed and mapped using modified pseudo-cylindrical mapping process 140, which maps frames of spherical video 142 to pseudo-cylindrical images and then compresses these images as is described in detail later in FIG. 6. Video encoder 144 encodes the compressed modified pseudo-cylindrical images for transmission over network 156 or for storage.

Video decoder 154 receives the encoded video stream from network 156. Post-process 150 de-compresses and un-maps the images, performing a reverse of the operation of modified pseudo-cylindrical mapping process 140. A recovered spherical video is obtained that is rendered in a spherical space by video rendering 152. The video can be displayed using panoramic display equipment such as a head-mounted display.

FIG. 6 is a flowchart of compression of a pseudo-cylindrical projection image. FIG. 6 shows modified pseudo-cylindrical mapping process 140 of FIG. 5 in more detail.

The spherical image is converted to a pseudo-cylindrical projection image by pseudo-cylindrical projection mapping 160. The y angle values are unchanged, while the x angle value is calculated as the cosine of the y angle value multiplied by the distance from the central meridian.

$$X=(\lambda-\lambda 0)\cos \varphi$$

$$Y=\varphi$$

where $\lambda$ is the angle from the central meridian (longitude), $\varphi$ is the angle from the equator (latitude), and X,Y is the Cartesian coordinate x,y value on the pseudo-cylindrical projection.

Since the pseudo-cylindrical projection is not a rectangle, but has a curved onion shape, there are areas within a bounding rectangle that have no pixels. In particular, the four corners of the bounding rectangle that encloses the pseudo-cylindrical projection have unused or non-effective areas where there are no image pixels. The bottom one-third of the pseudo-cylindrical projection is moved to the top corners of the bounding rectangle and placed in the unused non-effective areas, step 162. Then the bottom one-third of the image is deleted, step 164.

There are still unused, non-effective areas between the moved bottom corners and the top of the pseudo-cylindrical projection image. These non-effective areas are filled in with pixels that are created by linear interpolation, step 166. Creating linear-interpolated pixels provides for better video encoding that just having dark pixels in these unused areas. A sudden change in pixel values would result if dark or light pixels were used to fill in the non-effective areas. Such sudden changes in pixel values cause high-frequency image components that increase bit rates of compressed video streams and can cause visual artifacts due to encoding/ decoding. Thus filling non-effective areas with linear-interpolated pixels causes video encoder 144 of FIG. 5 to be more effective and efficient, reducing bandwidth requirements.

Figure 7A:
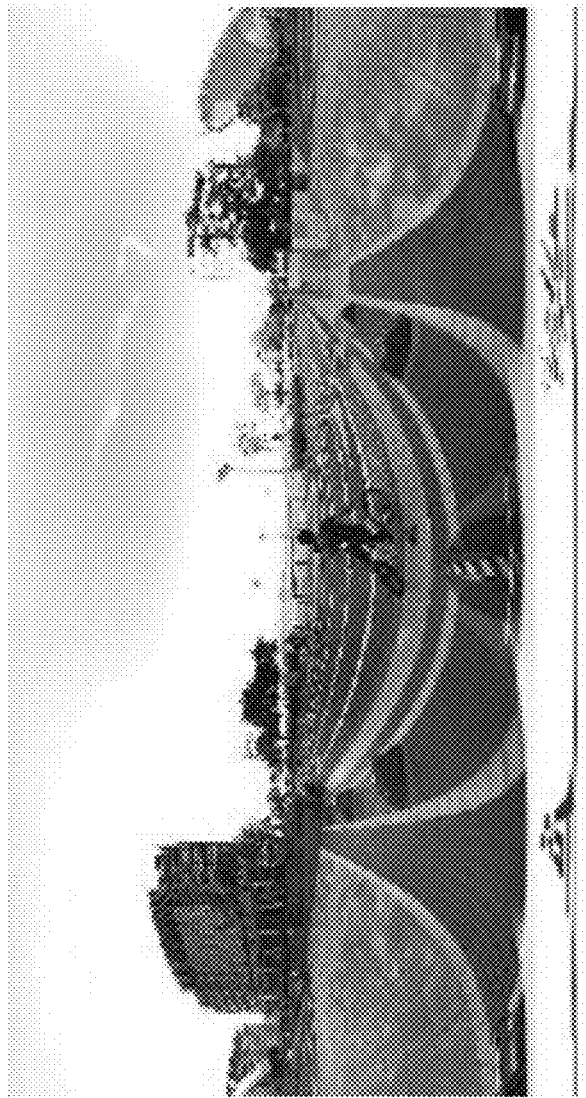
FIGS. 7A-7B show an input image being mapped from a spherical image space to a pseudo-cylindrical projection.
Figure 7B:
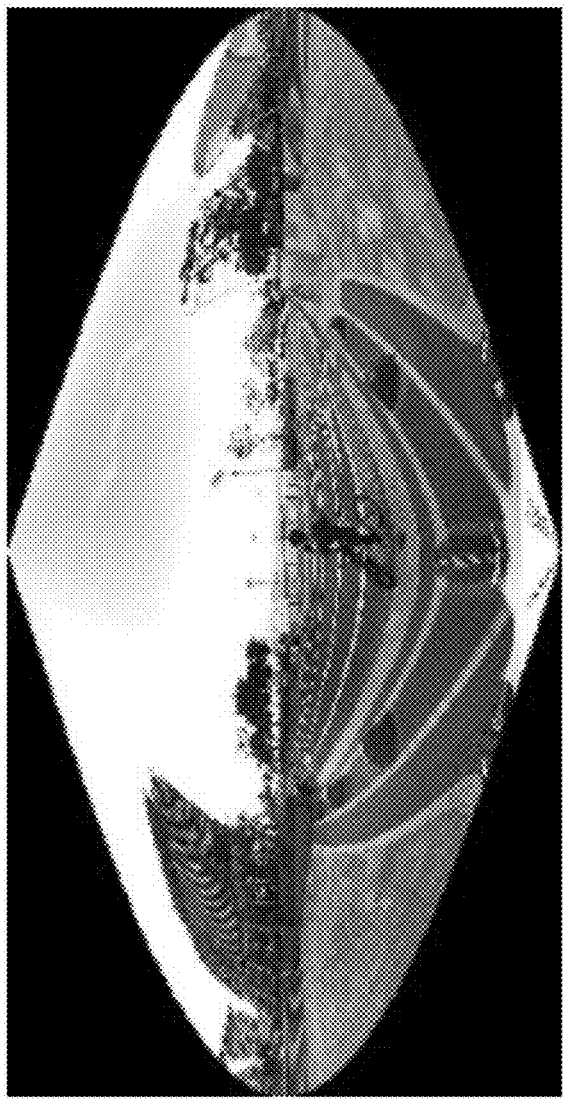

FIGS. 7A-7B show an input image being mapped from a spherical image space to a pseudo-cylindrical projection. FIG. 7A shows an input panoramic image. A bicyclist is on a road between a building on the left and trees in the background on the right. Although the road appears curved near the center of the panoramic image, the actual road is straight.

In FIG. 7B, pixels from the panoramic image of FIG. 7A are mapped to a pseudo-cylindrical projection image. A sinusoidal projection such as $$X=(\lambda-\lambda 0)\cos \varphi$$

$$Y=\varphi$$

can be used to generate the image of FIG. 7B from the input image of FIG. 7A. The four corners of the bounding rectangle are dark, since there are no pixels from the image of FIG. 7A that map to the four corners.

FIGS. 8A-8B show moving the bottom one-third of the pseudo-cylindrical projection image to the top corners. In FIG. 8A, dividing line 174 cuts rectangular bounding image 180 that contains the pseudo-cylindrical projection image into a top two-thirds above dividing line 174 and a bottom third below dividing line 174. For an image of 2160 rows, 1440 rows of pixels are above dividing line 174 and 720 rows of pixels are below dividing line 174. Vertical dividing line 176 is a portion of the central meridian.

In FIG. 8B, lower-left region 170 that is below dividing line 174 and to the left of vertical dividing line 176 is moved to the top right corner of rectangular bounding image 180, in the dark area outside of the pseudo-cylindrical projection image. Likewise, lower-right region 172 that is below dividing line 174 and to the right of vertical dividing line 176 is moved to the top left corner of rectangular bounding image 180, also in the dark area outside of the pseudo-cylindrical projection image.

The bottom one-third of the rows of pixels can be deleted, since pixels from lower-left region 170 and lower-right region 172 have been copied or moved to the upper corners of rectangular bounding image 180. The number of rows of pixels has been reduced from 2160 to 1440, a 33% reduction.

Since lower-left region 170 does not exactly match the dark non-effective area in the upper right of rectangular bounding image 180, there is a sliver of dark area remaining, interface region 178. Also, there is a wedge of dark non-effective area in each lower corner, below the equator of the original image, lower interface region 179.

FIGS. 9A-9B show linear-interpolated pixels created to fill interface regions in the compressed panoramic image. FIG. 9A shows rectangular bounding image 180 of FIG. 8B that has been cut by one-third after moving lower-left region 170 and lower-right region 172. There are no pixels in interface regions 178, 192, 179, so these regions appear dark. The sudden change from light pixels in the image regions to dark in the interface regions 178, 192, 179 can cause video encoding difficulties, so linear-interpolated pixels are generated to populate interface regions 178, 192, 179 as shown in FIG. 9B. The dark pixels or absence of pixels of interface region 178 is changed to linear-interpolated pixels in interpolated interface region 188. Likewise, lower interface region 179 is populated by replicating the last effective pixels to form interpolated interface region 189.

The size of the image has been reduced by one-third, from 2160 to 1440 rows. The final compressed image is 1440×3860.

FIGS. 10A-10B show creating linear-interpolated pixels to populate interface regions. Box 190 (FIG. 9B) showing interface region 192 is shown in more detail in FIG. 10A-10B. In FIG. 10A, pixel 274 is at the edge of interface region 192 and moved image region 194 that has the pixels moved from lower-left region 170 (FIG. 8B).

Pixel 272 is at the edge of interface region 192 and original image region 196 that has the pseudo-cylindrical projection image (FIG. 7B). Pixels 272, 274 are in the same row of pixels.

In FIG. 10B, linear-interpolated pixel 276 is created by linear interpolation of pixels 272, 274. Other pixels in the row between pixel 272 and pixel 274 are similarly created using linear interpolation. Interpolating pixels on the edges of other rows allows all pixels in interpolated interface region 198 to be created. Such linear interpolation smoothes the transition in pixel color across interpolated interface region 198, reducing video encoding artifacts and inefficiencies.

FIG. 11 shows encoding lookup tables to move pixel locations and to linear interpolate pixels. Rather than perform calculations for each pixel, lookup tables may be used to read the results for various input pixel locations. First lookup table 202 receives a pixel location (λ, φ) and outputs that pixel's (x,y) location after moving lower-right region 172 and lower-left region 170 to the non-effective area in the top corners. For pixels within the effective area of the input image, including lower-left region 170 and lower-right region 172, sinusoidal mapping is performed to convert the pixel's (λ, φ) location to outputs that pixel's (x,y) location within rectangular bounding image 180. This sinusoidal mapping performs a pseudo-cylindrical projection using the equations:

$$X=(\lambda-\lambda 0)\cos \varphi$$

$$Y=\varphi$$

Thus both sinusoidal projection and movement of lower-left region 170 and lower-right region 172 to the upper corners is performed by first lookup table 202.

For pixel (x,y) locations that are within interface region 178 and any other remaining non-effective areas, second lookup table 204 performs linear interpolation to generate blended pixel values to fill in interface region 178. Pixel values from both edges of a row crossing interface region 178 are blended together to generate the linear-interpolated pixel. Second lookup table 204 can store a fraction or percent value, and the left-edge pixel's value is multiplied by this fraction while the right-edge pixel's value is multiplied by 1 minus this fraction. These two results are summed to generate the linear-interpolated pixel value, or blended pixel value. A single table could perform both functions of first lookup table 202 and second lookup table 204.

FIG. 12 is a one-step decoding table. After transmission or storage, the encoded video stream is decoded. This decoding could be performed in runtime by a processor that performs the various calculations, or a lookup table could be used to directly supply the results for any encoded value. Decoding table 206 receives the pixel's (x,y) location within the encoded image, and that pixel's polar coordinates (λ, φ) in the reconstructed spherical image are directly read from the lookup table. The values stored in decoding table 206 include the effects of moving pixels from the upper corners back to lower-left region 170 and lower-right region 172, deleting linear-interpolated pixels in interface region 178, and reversing the pseudo-cylindrical projection to recover the spherical space pixels. These spherical space pixels can then be displayed to a user, such as with a head-mounted display.

FIGS. 13A-13D shows pre-processing the spherical image using multi-resolution mapping. In FIG. 13A, input spherical image 222 has a focus area 220 that can be the point of view of the user, or the area on image 222 that the user is looking at. Focus area 220 is the most important part of input spherical image 222 because the user's focus is on this portion of the image.

Input spherical image 222 is divided into 12 blocks, labeled 1 to 12 in FIG. 13B. Focus area 220 is in blocks 8 and 11. The focus blocks remain at the full input resolution, but other non-focus blocks 1-7, 9-10, and 12 are downsampled by one-half in both x and y directions, so that the downsampled blocks require only one-quarter the space as the original full-resolution blocks.

In FIG. 13C, focus blocks 8, 11 require four of the smaller blocks, while the other 10 downsampled blocks are placed around the focus blocks in the locations shown in FIG. 13C. FIG. 13D shows multi-resolution image 224 with full-resolution focus blocks 8, 11, and down-sampled blocks 1-7, 9-10, and 12. Multi-resolution image 224 can replace the original spherical image (FIG. 7A) before sinusoidal projection, lower third region movement, and linear interpolation is performed.

When the size of the input spherical image is 3840×1440, downsampling to multi-resolution image 224 can reduce the image size to 1920×1080, a reduction of 62.5%.

FIG. 14 is a flowchart of an alternative multi-resolution mapping process that downsamples non-focus blocks after pseudo-cylindrical projection. The spherical image is converted to a pseudo-cylindrical projection image by pseudo-cylindrical projection mapping 160 using the sinusoidal projection equations:

$$X=(\lambda-\lambda 0)\cos \varphi$$

$$Y=\varphi$$

After creating the pseudo-cylindrical projection image, downsampling of non-focus or non-viewport blocks is performed, step 230. This reduces the size of the pseudo-cylindrical projection image.

The bottom one-third of the partially-downsampled pseudo-cylindrical projection is moved to the top corners of the bounding rectangle and placed in the unused non-effective areas, step 162. Then the bottom one-third of the image is deleted, step 164. The non-effective areas are filled in with pixels that are created by linear interpolation, step 166.

FIGS. 15A-15D shows processing the pseudo-cylindrical projection image using multi-resolution mapping. In FIG. 15A, input spherical image 240 has a focus area in center block 40 that can be the point of view of the user.

Input spherical image 240 is divided into 9 blocks. Center block 40 is surrounded by side blocks 42 and top and bottom blocks 44, and corner blocks 46.

After sinusoidal projection, input spherical image 240 is downsampled by one-half to one-eights in the horizontal direction for side blocks 42 and one-half in the vertical direction for top and bottom blocks 44. Corner blocks 46 are downsampled by one-half to one-eights in both directions. The downsampled pseudo-cylindrical projection has a resolution of 1380×1620 and appears as downsampled pseudo-cylindrical projection image 242 in FIG. 15B. The amount of downsampling (½ to ⅛) can be dependent on the distance to center block 40.

In FIG. 15C, lower-left region and lower-right region are moved to the upper corners and the lower one-third of downsampled pseudo-cylindrical projection image 242 is deleted to generate reduced downsampled pseudo-cylindrical projection image 244. After linear interpolation is performed on interface regions, modified pseudo-cylindrical multi-resolution image 246 of FIG. 15D can encoded, stored, and transmitted.

When the size of the input spherical image is 3840×2160, downsampling to multi-resolution image 246 can reduce the image size to 1380×1260, a reduction of almost 80%.

Figure 16:
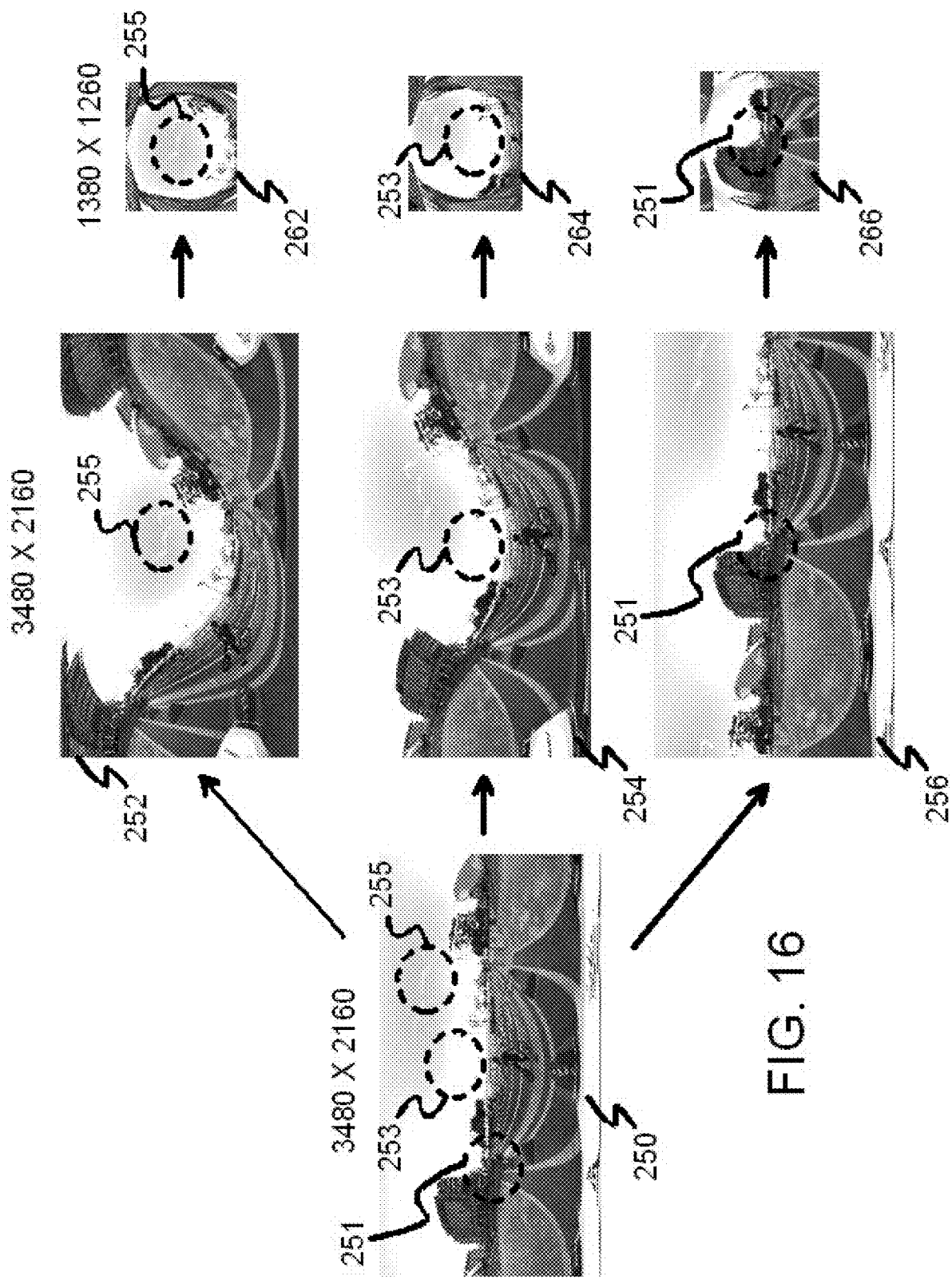
FIG. 16 shows multi-resolution projection.

FIG. 16 shows multi-resolution projection. The focus point can be changed, such as when the user moves a head-mounted display or otherwise changes the view point or focus.

When the focus of input spherical image 250 is focus area 255, input spherical image 250 is shifted so that focus area 255 is the center of input spherical image 250, producing transformed input spherical image 252, which can be used as the input spherical image and processed as shown in FIG. 14 using multi-resolution and modified pseudo-cylindrical projection and linear interpolation to generate modified pseudo-cylindrical multi-resolution image 262 with focus area 255 in the full-resolution center.

When the focus of input spherical image 250 is focus area 253, input spherical image 250 is shifted so that focus area 253 is the center of input spherical image 250, producing transformed input spherical image 254, which can be used as the input spherical image and processed as shown in FIG. 14 to generate modified pseudo-cylindrical multi-resolution image 264 with focus area 253 in the full-resolution center.

When the focus of input spherical image 250 is focus area 251, input spherical image 250 is shifted so that focus area 251 is the center of input spherical image 250, producing transformed input spherical image 256, which can be used as the input spherical image and processed as shown in FIG. 14 to generate modified pseudo-cylindrical multi-resolution image 266 with focus area 251 in the full-resolution center.

Figure 17:
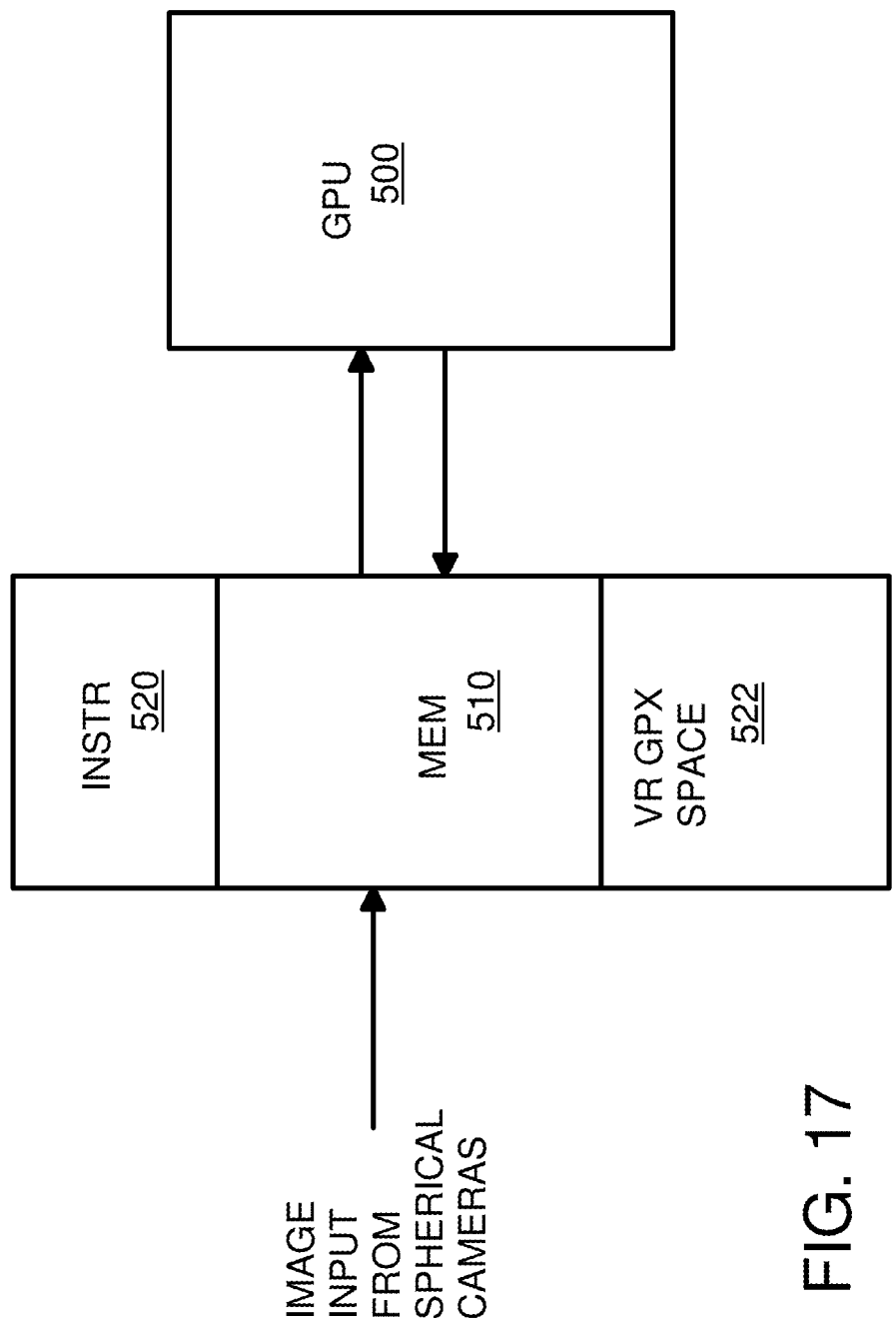
FIG. 17 is a block diagram of an image processor that performs modified pseudo-cylindrical projection and other processes described herein.

FIG. 17 is a block diagram of an image processor that performs modified pseudo-cylindrical projection and other processes described herein. Graphics Processing Unit (GPU) 500 is a microprocessor that has graphics-process enhancements such as a graphics pipeline to process pixels. GPU 500 executes instructions 520 stored in memory to perform the operations of the process flowcharts FIGS. 6 and 14.

Pixel values from input spherical images are input to memory 510 for processing by GPU 500, which may use lookup tables or a processor to move and interpolate pixels and writes pixel values to VR graphics space 522 in the memory.

Other VR applications can access the panorama image stored in VR graphics space 522 for display to a user such as in a Head-Mounted-Display (HMD).

Alternate Embodiments

Several other embodiments are contemplated by the inventor. For example a 1:1 sampling ration over the entire spherical image space has been described, but other sampling ratios could be substituted for all or portions of the spherical image space. Uniform quality has been described for all view points or focus areas in some embodiments, but adaptive view streaming, change of focus points, and multi-resolution mapping may be substituted or combined in various ways. Various fields of view may be used. Multiple encoding streams may be used or combined for transmission or storage. Various table lookup schemes may be used with one or multiple lookup steps. Values stored and read from lookup tables may be scaled, multiplied, or otherwise operated upon to generate outputs.

While a value of one-third has been used for the location of dividing line 174, other values could be used as long as the moved areas do not overlap the pseudo-cylindrical projection image. The moved regions such as lower-right region 172 are moved into non-effective areas that do not contain any pixels for the input image, pseudo-cylindrical projection 130. Placing dividing line 174 above one-third of the rows allows one-third of the rows to be deleted, compressing the image by 33%. One-third is a good choice for pseudo-cylindrical projection because lower-left region 170, lower-right region 172 can fit in the non-effective regions in the top corners, but other fractions and compression ratios could be substituted. For example, dividing line 174 may be at the 30-70 boundary of rows, so that at least 30% of the rows are below dividing line 174, and compression is at least 30%.

Moved regions such as lower-right region 172 could be moved to other locations, flipped, inverted, or crossed over when being moved. The moved pixels could be encoded in various ways, such as generating inverted pixels or color mapped pixels, and this encoding or mapping could be undone by the decoding process. The moved pixels could be the same format as image pixels, or could be a different or modified format.

While the non-effective areas have been described as being dark, the default pixel values for non-effective regions could be white, gray, blue, green, or some other default value. The absence of image pixels in the non-effective region could imply a dark pixel, or another default pixel value. Pixel memory may default to this default pixel value or may be written with the default pixel value, such as when initializing memory.

Since physical memory devices are arranged as rows and columns of memory cells, memory space has a rectangular shape. Rectangular bounding image 180 (FIG. 8A) is the memory space allocated to store the pseudo-cylindrical projection image, which is not rectangular in shape. The area within rectangular bounding image 180 that is outside of the pseudo-cylindrical projection image is the non-effective area that has default pixel values. Pixels may be moved by being copied to the upper corners so that the original pixel values still remain in lower-right region 172 and lower-left region 170. Bounding image 180 does not necessarily have to be rectangular, but could be other shapes, such as round or spherical for a memory arranged in polar coordinates. Bounding image 180 could have cutouts or notches in the rectangular or other memory space, such as for reserved memory areas, for bad physical memory locations, for storing overhead information such as metadata, etc. Likewise, the spherical image may have cutouts or areas without image pixels for various reasons, such as limits of the cameras. Thus the spherical image does not have to be a full and complete sphere.

Directional terms such as up, down, above, below, upper, lower, right, left, are used for better understanding the invention, and can be interchangeable, such as by flipping the image over or reversing the image, projection, or memory space. Thus these directional terms are not meant to be limiting.

Different downsampling rates or ratios could be substituted. Downsampling can be performed at various points in the flow, such as before or after sinusoidal projection. Downsampling could be performed on the input spherical image before sinusoidal projection, or after sinusoidal projection on the pseudo-cylindrical projection image. Downsampling could even be performed on the modified pseudo-cylindrical projection image after lower-left region 170 and lower-right region 172 are moved to the top corners, or after linear interpolation of interface region 178. Downsampling may vary from region to region, and for x and y directions (rows and columns). Downsampling could be adjusted for network conditions so that larger downsampling ratios are used during poor network conditions.

Table lookups could be used to implement various functions, replacing runtime computations with a one-step lookup. The various multi-resolution projection techniques can be combined in various ways with each other and with the flows of FIGS. 6, 14.

Several other embodiments are contemplated by the inventor. For example, additional functions and step could be added, and some steps could be performed simultaneously with other steps, such as in a pipeline, or could be executed in a re-arranged order. Forward, backward, or bi-directional motion compensation could be performed using intracoded, predictive, and bi-directional predictive frames when the video stream is encoded or compressed using an motion-picture-experts group (MPEG) or other encoding system.

While a single panorama image space that can be generated by stitching together images has been described, the images could be part of a sequence of images, such as for a video, and a sequence of panoramic images could be generated for different points in time. The panoramic space could thus change over time.

While YUV pixels are contemplated, other formats for pixels could be accepted and converted into YUV format. The YUV format itself may have different bit encodings and bit widths (8, 16, etc.) for its sub-layers (Y, U, V), and the definitions and physical mappings of Y, U, and V to the luminosity and color may vary. Other formats such as RGB, CMYK, HSL/HSV, etc. could be used. The term YUV is not restricted to any particular standard but can encompass any format that uses one sub-layer (Y) to represent the brightness, regardless of color, and two other sub-layers (U,V) that represent the color space.

The number of Y value data points that are averaged when generating linear-interpolated pixels for interface region 178 can be adjusted. Pixels could be averaged in two dimensions (multiple rows) rather than just alone one row. More data points being averaged together produces a smoother color transitions within interface region 178. Likewise, lower interface region 179 may be populated by replicating the last effective pixels to form interpolated interface region 189. Linear interpolation could be replaced by other filling methods, such as filling the interface regions with replicated pixels, pixels having a fixed gradient or other gradient, or by replicating pixels from the image that are at or near the edge of the interface regions. The interpolation could be non-linear, or use some formula other than a linear formula, such as a non-linear gradient that is still monotonic. When the interface region has image pixels on one side of a row but no image pixels on the other side of the row, the image pixel from the one side can be replicated across the entire row. Alternately, a fixed default pixel value could be assigned for the side with no image pixels, and linear-interpolated pixels used to fill the row.

Various resolutions could be used, such as HD, 4K, etc., and pixels and sub-layers could be encoded and decoded in a variety of ways with different formats, bit widths, etc. Additional image processing such as for masks could be used, such as for facial recognition, image or object tracking, etc.

While images have been shown, the appearances of any errors or artifacts may vary greatly with the image itself, as well as with the processing methods, including any pre-processing. Such images that are included in the drawings are merely to better understand the problems involved and how the inventor solves those problems and are not meant to be limiting or to define the invention.

Color pixels could be converted to gray scale for various processes, such as for searching in search windows with a query patch. Color systems could be converted during pre or post processing, such as between YUV and RGB, or between pixels having different bits per pixel. Various pixel encodings could be used, and frame headers and audio tracks could be added. GPS data or camera orientation data could also be captured and attached to the video stream.

The size, format, and type of pixels may vary, such as RGB, YUV, 8-bit, 16-bit, or may include other effects such as texture or blinking. Adaptive routines may also be used. Lower resolutions may be used in some regions, while higher resolutions are used near object boundaries or in regions with a high level of detail.

The number of images that are stitched together to form a panorama may vary with different applications and camera systems, and the relative size of the overlap regions could vary. Panoramic images and spaces could be 360-degree, or could be spherical or hemi-spherical, or could be less than a full 360-degree wrap-around, or could have image pieces missing for various reasons. The shapes and other features of curves and histograms can vary greatly with the image itself.

Various combinations of hardware, programmable processors, software, and firmware may be used to implement functions and blocks. Pipelining may be used, as may parallel processing. Various routines and methods may be used, and factors such as the search range for linear interpolation and block size may also vary.

It is not necessary to fully process all blocks or regions in each time-frame. For example, only a subset or limited area of each image could be processed. It may be known in advance that a moving object only appears in a certain area of the panoramic frame, such as a moving car only appearing on the right side of a panorama captured by a camera that has a highway on the right but a building on the left. The "frame" may be only a subset of the still image captured by a camera or stored or transmitted.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A modified pseudo-cylindrical mapper comprising:
    a pseudo-cylindrical projector that receives at least a portion of a spherical image and generates a pseudo-cylindrical projection image from the spherical image;
    a memory manager that allocates a plurality of rows of memory to store the pseudo-cylindrical projection image, wherein the plurality of rows of memory form a bounding image space that encloses the pseudo-cylindrical projection image;
    wherein the pseudo-cylindrical projection image is not rectangular;
    wherein first corners of the bounding image space have no pixels from the pseudo-cylindrical projection image;
    a first pixel mover that moves first image pixels from the pseudo-cylindrical projection image that are on a first side of a dividing line in the plurality of rows and are to a first side of a centerline, wherein the first image pixels are moved to a first of the first corners of the bounding image space;
    a second pixel mover that moves second image pixels from the pseudo-cylindrical projection image that are on the first side of the dividing line in the plurality of rows and not on the first side of the centerline, wherein the second image pixels are moved to a second of the first corners of the bounding image space;
    a compressor that deletes pixels that are on the first side of the dividing line to reduce a size of the bounding image space to exclude pixels that are on the first side of the dividing line; and
    a pixel generator that generates fill pixels that are written to interface regions in the bounding image space that are not on the first side of the dividing line, wherein the interface regions have no pixels from the pseudo-cylindrical projection image.

2. The modified pseudo-cylindrical mapper of claim 1 wherein the pseudo-cylindrical projector comprises a sinusoidal projector and wherein the bounding image space is a rectangle, and wherein
    the first pixel mover moves first image pixels from the pseudo-cylindrical projection image that are below a dividing line row in the plurality of rows and are to a left of the centerline, wherein the first image pixels are moved to a first upper corner of the bounding image space;
    the second pixel mover moves second image pixels from the pseudo-cylindrical projection image that are below the dividing line row in the plurality of rows and are to a right of the centerline, wherein the second image pixels are moved to a second upper corner of the bounding image space;
    the compressor deletes rows in the plurality of rows that are below the dividing line row in the plurality of rows to reduce a size of the bounding image space to exclude rows in the plurality of rows that are below the dividing line row.

3. The modified pseudo-cylindrical mapper of claim 2 wherein the first of the first corners is right of the centerline;
    wherein the second of the first corners is left of the centerline;
    wherein the first image pixels are moved from a bottom left corner to a top right corner of the bounding image space;
    wherein the second image pixels are moved from a bottom right corner to a top left corner of the bounding image space;
    wherein image pixels are crossed over the centerline when moving from bottom to top.

4. The modified pseudo-cylindrical mapper of claim 3 wherein the pixel generator is a linear interpolator.

5. The modified pseudo-cylindrical mapper of claim 3 wherein the pixel generator reads source image pixels from rows adjacent to a current row of an fill pixel being generated;
    whereby the pixel generator performs two-dimensional interpolation.

6. The modified pseudo-cylindrical mapper of claim 2 wherein at least 30% of the rows in the plurality of rows are on the first side of the dividing line;
    wherein the compressor deletes pixels in at least 30% of the rows in the plurality of rows
    wherein compressor reduces the bounding image space by at least 30%.

7. The modified pseudo-cylindrical mapper of claim 2 wherein the pixel generator is a pixel interpolator that reads a left image pixel and a right image pixel for each row of the interface regions;
    wherein the left image pixel is an image pixel in the pseudo-cylindrical projection image that is adjacent to a left edge of the interface regions;
    wherein the right image pixel is an image pixel in the pseudo-cylindrical projection image that is adjacent to a right edge of the interface regions;
    wherein the pixel interpolator adds a first fraction of the left image pixel to a second fraction of the right image pixel to generate an interpolated pixel as the fill pixel.

8. The modified pseudo-cylindrical mapper of claim 7 wherein the first fraction is a function of a distance between the left image pixel and the interpolated pixel.

9. The modified pseudo-cylindrical mapper of claim 7 wherein the left image pixel and the right image pixel are in a same row of the interface regions.

10. The modified pseudo-cylindrical mapper of claim 2 further comprising:
    a lookup table that is addressed by a location of an image pixel in the spherical image, and reads out a location of the image pixel within the bounding image space, wherein the location is adjusted by the first pixel mover, the second pixel mover, or the pseudo-cylindrical projector, whereby the lookup table maps image pixels to locations within the bounding image space to account for operations of the first pixel mover, the second pixel mover, or the pseudo-cylindrical projector.

11. The modified pseudo-cylindrical mapper of claim 10 wherein the lookup table, when addressed by a location in the interface regions, further stores interpolation factors for combining a left image pixel and a right image pixel for each row of the interface regions to generate fill pixels.

12. The modified pseudo-cylindrical mapper of claim 2 further comprising:

a downsampler for reducing a resolution of non-focus blocks of image pixels in the pseudo-cylindrical projection image;

wherein non-focus blocks are downsampled while focus blocks retain full resolution.

13. The modified pseudo-cylindrical mapper of claim 12 wherein the downsampler reads image pixels from the spherical image, whereby downsampling is performed before the pseudo-cylindrical projector generates the pseudo-cylindrical projection image.

14. The modified pseudo-cylindrical mapper of claim 13 further comprising:

a focus selector that selects focus blocks in the spherical image, the focus selector changing selection of the focus blocks in response to a change in a user's viewpoint within the spherical image.

15. The modified pseudo-cylindrical mapper of claim 12 wherein the downsampler reads image pixels from the pseudo-cylindrical projection image, whereby downsampling is performed after the pseudo-cylindrical projector generates the pseudo-cylindrical projection image.

16. The modified pseudo-cylindrical mapper of claim 1 wherein the pseudo-cylindrical projector generates a cosine of a y angle from an equatorial parallel of the spherical image multiplied by an angle from a central meridian of the spherical image.

17. The modified pseudo-cylindrical mapper of claim 16 wherein the pseudo-cylindrical projector receives a longitude $\lambda$ and a latitude $\varphi$ of a location for each image pixel in the spherical image;

wherein the pseudo-cylindrical projector further comprises a mapper that generates a Cartesian coordinate X,Y value of a location of a image pixel in the pseudo-cylindrical projection image by calculating X as a cosine of the latitude $\varphi$ multiplied by a distance of the longitude $\lambda$ from the central meridian $\lambda 0$ and by copying latitude $\varphi$ to be a Y value.

18. A panoramic video method comprising:

receiving a series of a spherical image at a video input;
performing a sinusoidal transform of the spherical image to generate a pseudo-cylindrical projection image that is non-rectangular and is mapped to a memory space wherein image pixels below a dividing line are moved to non-effective upper corners of the memory space that are outside the pseudo-cylindrical projection image, wherein image pixels below the dividing line are deleted to compress the memory space to a compressed memory space;

generating fill-in pixels to fill non-effective areas of the compressed memory space;

encoding the image pixels and the fill-in pixels in the compressed memory space for transmission as transmitted pixels;

decoding the transmitted pixels to generate a recovered memory space;

deleting fill-in pixels in the recovered memory space and moving image pixels from non-effective upper corners of the recovered memory space to recovered rows of pixels below the dividing line to generate a recovered pseudo-cylindrical projection image;

performing an inverse sinusoidal transform on the recovered pseudo-cylindrical projection image to generate a recovered spherical image; and rendering the recovered spherical image in a spherical image space for display to a user.

19. A panoramic image compressor comprising:

a panoramic image input for receiving a spherical image;
a sinusoidal transformer that converts the spherical image to a pseudo-cylindrical projection image by multiplying a cosine of a latitude angle to a equatorial parallel with a longitudinal angle from a central meridian to generate an X location of an image pixel in the pseudo-cylindrical projection image;

a memory space for storing the pseudo-cylindrical projection image;

a pixel mover that moves image pixels within the memory space, wherein image pixels in the pseudo-cylindrical projection image that are on a first side of a dividing line are moved to corners of the memory space that are outside of the pseudo-cylindrical projection image;

a row compressor for reducing the memory space to exclude rows on the first side of the dividing line, wherein rows of image pixels on the first side of the dividing line are discarded; and a pixel interpolator that generates interpolated pixels from two or more source pixels in the pseudo-cylindrical projection image and in the corners of moved image pixels, wherein the interpolated pixels are written to the memory space on a side opposite of the first side of the dividing line to fill remaining areas having no image pixels.

20. The panoramic image compressor of claim 19 further comprising:

a down-sampler for compressing image pixels in the spherical image by combining four or more image pixels into a single image pixel for compressed regions of the spherical image;

wherein the memory space is rectangular.

* * * * *